United States Patent [19]

Sherif et al.

[11] Patent Number: 4,734,133

[45] Date of Patent: Mar. 29, 1988

[54] FAST-SETTING CEMENTS FROM SUPERPHOSPHORIC ACID

[75] Inventors: Fawzy G. Sherif, Stony Point; Antoinette G. Ciamei, White Plains, both of N.Y.

[73] Assignee: Stauffer Chemical Company, Westport, Conn.

[21] Appl. No.: 863,284

[22] Filed: May 15, 1986

[51] Int. Cl.$^4$ .................... C04B 9/04; C04B 35/04
[52] U.S. Cl. ........................ 106/85; 501/111
[58] Field of Search ................ 501/111; 106/85

[56] References Cited

U.S. PATENT DOCUMENTS

| | | | |
|---|---|---|---|
| 3,202,520 | 8/1965 | Enoch | 106/85 OR |
| 3,475,188 | 10/1969 | Woodhouse et al. | 501/111 OR |
| 3,525,632 | 8/1970 | Enoch | 106/85 OR |
| 3,821,006 | 6/1974 | Schwartz | 106/85 |
| 3,879,209 | 4/1975 | Limes et al. | 501/111 |
| 4,059,455 | 11/1977 | Limes et al. | 106/101 |
| 4,174,227 | 11/1979 | Tomic | 106/85 |
| 4,487,632 | 12/1984 | Sherif et al. | 106/85 OR |

*Primary Examiner*—Mark L. Bell
*Assistant Examiner*—Karl Group
*Attorney, Agent, or Firm*—Hensley M. Flash

[57] ABSTRACT

Process for preparing dry fast-setting, magnesium phosphate cementitious composition capable of setting to a hardened mass at ambient temperatures following the addition of water thereto is disclosed. In this process unfiltered superphosphoric acid is added to a mixture of a magnesium-containing compound, e.g. MgO, and an aggregate, e.g. silica, with cooling to form a dry powder. This dry powder can be stored without caking, and forms a fast-setting cement having commercially acceptable compressive strength in the presence of water.

8 Claims, No Drawings

FAST-SETTING CEMENTS FROM SUPERPHOSPHORIC ACID

BACKGROUND OF THE INVENTION

1. Field of the Invention

This invention relates to a process for preparing fast-setting magnesium phosphate cementitious compositions. More particularly, it relates to fast-setting cementitious compositions from superphosphoric acid.

2. Related Information

Fast-setting cementitious compositions having utility for various purposes for which concretes are employed have been heretofore known.

U.S. Pat. No. 3,202,520 (Enoch, Aug. 8, 1965) discloses a rapid set non-hygroscopic cement composition consisting essentially of a blend of a phosphate derived from phosphoric acid and of alumina, and containing from 15 to 55 weight percent of $P_2O_5$ and from 45 to 75 weight percent of alumina, and from 5 to 18 weight percent of magnesium oxide. The phosphoric acid is used in its liquid state then moisture is removed by drying the blend above 122° F.

U.S. Pat. No. 3,525,632 (Enoch, Aug. 25, 1970) discloses a rapid-setting concrete cement composition which comprises dry blending magnesium-containing compounds, aluminum-containing compounds and phosphorus-containing compounds from stated sources in stated weight percentages, and then pulverizing the blended material without a separate drying stage. The phosphorus-containing compound is a mixture derived from phosphoric acid, and at least 50 weight percent of one of trimagnesium phosphate, aluminum orthophosphate, and phosphoric anhydride.

U.S. Pat. No. 3,879,209 (Limes et al., Apr. 22, 1975) discloses a process for making a fast-setting concrete comprising establishing a mixture of an aggregate containing at least 10 percent by weight of magnesia and ammonium phosphates in aqueous solution. This patent further discloses that a commercial (agriculture fertilizer) product known as sequestered phosphatic solution (SPS) is particularly suitable as the source of the ammonium phosphate. The ammonium component is an essential feature of this invention.

U.S. Pat. No. 4,059,455 (Limes et al., Nov. 22, 1977) discloses a process for making a fast-setting concrete comprising establishing a mixture of an aggregate, containing at least 1% magnesia, and ammonium phosphates in aqueous solution. Again, the ammonium component is essential for attainment of the desired results of the invention.

U.S. Pat. No. 4,174,227 (Tomic, Nov. 13, 1979) discloses a grouting system comprising an acidic reactive component comprising at least one acidic oxy phosphorus compound selected from phosphoric acids, anhydrides of phosphoric acids and salts of phosphoric acids with multivalent metal cations, and a basic reactive component comprising at least one basic metal compound of a Group II or Group III metal capable of reacting with the oxy phosphorus compound(s) in the presence of water to form a monolithic solid.

U.S. Pat. No. 3,821,006 (Schwartz, June 28, 1974) discloses a patching composition consisting essentially of a reactive component of MgO with an acid phosphate salt and an inert aggregate component. The particle size of the inert aggregate component is related to the compressive strength of the cement formed at an early cure age.

The mixtures employed in the methods of the patents discussed above set and develop usable strength much more rapidly than conventional materials. Nonetheless, each of these patents is limited (as discussed above) and therefore distinguishable from the processes of the present invention in several ways.

U.S. Pat. No. 3,475,188 (Woodhouse et al., Oct. 28, 1969) discloses a dry refractory composition consisting essentially of a liquid bonding agent absorbed onto an absorbent, up to 80% by weight being absorbed thereon, magnesium oxide and refractory aggregate. The liquid bonding agents disclosed include sulfuric acid, hydrochloric acid, chromic acid and phosphoric acid. The absorbents disclosed include Kieselguhr, bentonite, fuller's earth, chrome ore or mixtures thereof.

SUMMARY OF THE INVENTION

An object of this invention is to provide a dry fast-setting magnesium phosphate cementitious composition that can be stored without caking and further is capable of setting to a hardened mass at ambient temperatures following the addition of water thereto.

Other objects and advantages of the present invention are shown throughout this specification.

In accordance with the present invention a process for preparing a dry, fast-setting magnesium phosphate cementitious composition capable of setting to a hardened mass at ambient temperatures following the addition of water thereto has now been discovered. This process comprises adding unfiltered superphosphoric acid to a mixture of a magnesium-containing compound and an aggregate with cooling to form a dry powder, said dry powder being maintained at room temperature or below during the addition of the acid.

DETAILED DESCRIPTION OF THE INVENTION

The present invention is an improved process for preparing a dry, fast-setting magnesium phosphate cementitious composition. In this process unfiltered superphosphoric acid is added to a mixture of a magnesium-containing compound and an aggregate with cooling to form a dry powder.

The unfiltered superphosphoric acid useful in this invention can contain from about 5 weight percent to about 10 weight percent solids. A typical example of this superphosphoric acid is supplied by Texasgulf Inc. and a typical specification sheet for this product is disclosed below.

SPECIFICATION

| SUPERPHOSPHORIC ACID | |
|---|---|
| Component | Typical Percent |
| Total $P_2O_5$ | 70.3 |
| Polyphosphate, % of total $P_2O_5$ | 38.9 |
| Iron, as $Fe_2O_3$ | 1.8 |
| Aluminum, as $Al_2O_3$ | 0.8 |
| Fluoride, as F | 0.2 |
| Magnesium, as MgO | 1.6 |
| Sulfate, as $SO_4$ | 3.6 |
| Calcium, as CaO | 0.2 |
| Solids, methanol insoluble | 8.5 |
| Specific Gravity at 75° F. | 2.00 |
| Weights at 75° F. | |
| Pounds/Gallon | 16.6 |
| Pounds $P_2O_5$/Gallon | 11.6 |

-continued

| SUPERPHOSPHORIC ACID | |
|---|---|
| Component | Typical Percent |
| Gallons/Ton | 120.5 |
| Color | Light green |
| Viscosity Apparent Brookfield | |
| Temperature °F. | Centipoise |
| 100 | 1120 |
| 125 | 560 |
| 150 | 305 |

The magnesium-containing compound can be any compound capable of supplying magnesium ions for reacting with the $P_2O_5$ content of the superphosphoric acid to form a fast-setting magnesium phosphate cement. Preferred magnesium-containing compounds are magnesium oxide, magnesium hydroxide, magnesium carbonate or mixtures thereof. These compounds can react with the acid in the presence of water to form a monolithic solid. A more preferred magnesium-containing compound is MgO. This MgO can be of low reactivity, of high reactivity or a mixtures of low and high reactivity, wherein the ratio of the constituents of the mixture is selected to achieve the working time and cement strength desired.

The aggregate, preferably graded sand, can be included in the cement composition in a controlled amount as a filler. Aggregates can greatly enhance the strength of the hardened concrete cement. Other aggregate materials which can be used include particles of competent rocks or rock forming minerals such as granite, basalt, dolomite, andesite, feldspars, amphiboles, pyroxenes, olivine, gabbro, rhyolite, syenite, diorite, dolerite, peridotite, trachyte, obsidian, quartz, etc., as well as materials such as slag, cinders, fly ash, glass cullet, wood chips and fibrous materials such as chopped metal wire (preferably steel), glass fibers, asbestos, cotton and polyester and aramide fibers. Aggregates having different particle shapes and sizes can be used. Mixtures of different aggregates can also be used.

The mixture of the magnesium-containing compound and the aggregate can be mildly agitated while the unfiltered superphosphoric acid is being added. The final dry composition can contain from about 5 to about 50 weight percent of the superphosphoric acid and preferably from about 20 to about 40 weight percent, from about 10 to 90 weight percent of the magnesium-containing compound and preferably from about 15 to about 50 weight percent and the aggregate can contain from about 10 to about 90 weight percent of the final composition with a preferred range being from about 70 to about 90 weight percent. During the addition of the acid to the mixture of magnesium-containing compound and aggregate, there is accompanying cooling. This cooling can be effected by any of the known means and can maintain the temperature from room temperature or below during the addition of the acid. Temperature ranges of from about 0° to about 30° C. are useful and a temperature range of from about 0° to about 10° C. is preferred.

The unfiltered superphosphoric acid must be added to the mixture of magnesium-containing compound and aggregate in its concentrated unfiltered form. If the acid is diluted before addition, the dry, storage-stable, cementitious composition will not be formed. It is believed that the water will hydrolyze pyrophosphate and polyphosphate species in the acid. The result is a mass that sets to form a concrete in a very short time, typically about 1 minute, rather than the desired dry, storage-stable, cementitious composition.

Generally, the fast-setting cement of this invention can be used for producing fast-setting concrete structures, e.g. structures suitable for roadway construction and roadway patches or other load-bearing uses, however in its broader aspects, the invention is generally applicable to preparing concrete structures with various characteristics, e.g., high or low strength, for a variety of other purposes as well. The characteristics of any particular concrete structure formed can depend upon the weight ratio of the various components, the nature of the aggregate employed, the temperature conditions of application and the curing conditions as well as other factors.

Fast-settings cements can be applied indoors or outdoors to concrete drives, storage yards, warehouse and factory floors to repair and restore damaged surfaces. Fast-setting cement can be used to fill structural cracks in slabs, and repair highway median barrier walls. This type of cement can be used in almost any situation requiring a quick, permanent repair of concrete. In addition, the fast-setting cement can be used for binding and coating metals and woods for structural and flame-resistant applications.

Generally, the setting time for fast-setting cement varies widely and can range from a few seconds up to a few hours. As a practical matter, the setting time must be sufficient to allow the acidic component, the magnesium-containing compound and the optional aqueous component and aggregate to be thoroughly mixed to form a slurry or noncollapsible putty and be applied to the intended area, whether a mold or a patch, prior to hardening into a monolithic solid.

The amount of water added to hydrate the composition is important. Too much water can convert the cement composition into a thin slurry that will not set until substantial dehydration occurs; and, too little water will not adequately wet the components of the composition sufficiently to allow the necessary chemical reaction. The optimum amount of water will depend upon the particular physical characteristics of the constituents of the composition, e.g., absorbency, surface area, etc. However, the optimum amount of water must be sufficient to adequately wet the constituents of the composition and optional aggregate mixture to form a thick slurry or non-collapsible putty. This optimum amount of water can be determined on a composition by composition basis.

In a preferred embodiment of the process of this invention, the weight ratio of magnesium-containing compound to aggregate ranges from about 1:2 to about 1:8, and the resulting dry cementitious composition contains from about 5 to about 10 weight percent of superphosphoric acid as $P_2O_5$.

The following experiments describe various embodiments of the invention. Other embodiments will be apparent to one of ordinary skill in the art from a consideration of this specification or practice of the invention disclosed herein. It is intended that the specifications and experiments to be considered as exemplary only, with the true scope and spirit of the invention being indicated by the claims which follow the experiments.

EXPERIMENTS

Green, unfiltered superphosphoric acid containing 70 weight percent $P_2O_5$ and 8.5 weight percent solids was added gradually to an MgO/aggregate mixture containing 20 weight percent MgO and 80 weight percent aggregate. The aggregate was sand of average diameter 0.05 inches (0.127 cm). The addition was accompanied by intermittent cooling to maintain the mixture at a temperature below 35° C. The molar ratio of $P_2O_5$ to MgO was 1:9. A fast-setting cement was formed upon the addition of water. The following Table I summarizes the results obtained from various experiments.

TABLE I

| Run | $P_2O_5$ Material gms. | 1:4 MgO/ Aggregate gms. | $H_2O$, gms. | Initial Set Time mins. | Compressive Strength, psi 2 hrs. | 28 days |
|---|---|---|---|---|---|---|
| 1 | 29–31[1] | 190–300 | 28–30 | 1–6 | 2000–3500 | 4000 |
| 2 | 30[2] | 267 | 30 | 12 | 2700 | — |
| 3 | 29[3] | 267 | — | 0.5 | 200 | — |

[1] Several samples of $P_2O_5$ material/MgO/aggregate aged overnight prior to water addition.
[2] $P_2O_5$ material/MgO/aggregate from Run 1 aged 4 weeks prior to water addition.
[3] $P_2O_5$ material diluted with 28 gms. of water prior to addition of MgO/aggregate.

The above results indicate that when water was added to the superphosphoric acid prior to mixing with the MgO/aggregates, no dry composition was formed, instead a cementitious mass was formed within 0.5 minutes that was not suitable for storage as a product (see Run 3). Whereas, when the process of the present invention was followed, a dry, storage-stable composition resulted, which formed a satisfactory cement upon hydration (see Run 1). In Run 2, the composition of Run 1 was stored for 4 weeks prior to hydration and still resulted in a satisfactory product.

What is claimed is:

1. A process for preparing a dry fast-setting magnesium phosphate cementitious composition capable of setting to a hardened mass at ambient temperatures following the addition of water thereto comprising adding unfiltered superphosphoric acid to a mixture of a magnesium-containing compound and an aggregate with cooling to form a dry powder, said dry powder being maintained at room temperature or below during the addition of the acid.

2. The process of claim 1 wherein the superphosphoric acid has a $P_2O_5$ content of about 70 weight percent.

3. The process of claim 1 wherein the magnesium-containing compound is selected from the group consisting of magnesium oxide, hydroxide, carbonate or mixtures thereof.

4. The process of claim 1 wherein the aggregate is silica.

5. The process of claim 1 wherein the weight ratio of magnesium-containing compound to aggregate ranges from about 1:2 to about 1:8.

6. The process of claim 1 wherein the resulting dry composition contains about 5 to about 10 weight percent of superphosphoric acid as $P_2O_5$.

7. The process of claim 1 wherein the cooling is sufficient to maintain the dry powder at a temperature from about 0° C. to about 30° C.

8. The process of claim 1 wherein the resulting dry composition contains from 5 to about 10 weight percent superphosphoric acid, the magnesium-containing compound is MgO, the aggregate is silica, the weight ratio of MgO to silica ranges from about 1:2 to about 1:8 and the cooling is sufficient to maintain the dry powder at a temperature from about 0° C. to about 10° C. during the addition of the acid.

* * * * *